(12) United States Patent
Isomura et al.

(10) Patent No.: US 12,464,854 B2
(45) Date of Patent: Nov. 4, 2025

(54) OPTICAL POWER SUPPLY CONVERTER

(71) Applicant: Dexerials Corporation, Tochigi (JP)

(72) Inventors: Takatomo Isomura, Kyoto (JP); Etsuji Omura, Kyoto (JP)

(73) Assignee: Dexerials Corporation, Tochigi (JP)

( * ) Notice: Subject to any disclaimer, the term of this patent is extended or adjusted under 35 U.S.C. 154(b) by 0 days.

(21) Appl. No.: 18/361,905

(22) Filed: Jul. 30, 2023

(65) Prior Publication Data

US 2024/0021748 A1    Jan. 18, 2024

Related U.S. Application Data

(63) Continuation of application No. PCT/JP2021/003920, filed on Feb. 3, 2021.

(51) Int. Cl.
*H10F 77/42*    (2025.01)
*G02B 6/42*    (2006.01)

(52) U.S. Cl.
CPC ......... *H10F 77/488* (2025.01); *G02B 6/4214* (2013.01)

(58) Field of Classification Search
CPC .. H01L 31/0547; G02B 6/4214; H10F 77/488
See application file for complete search history.

(56) References Cited

U.S. PATENT DOCUMENTS 5,414,600 A * 5/1995 Strobl ................. G02B 6/0006
                                                                          362/267
2011/0108081 A1    5/2011 Werthen et al.

FOREIGN PATENT DOCUMENTS

| JP | 09113768 A | * | 5/1997 |
| JP | H09113768 | | 5/1997 |
| JP | H11237531 | | 8/1999 |
| JP | H11237531 A | * | 8/1999 |
| JP | 2003307603 | | 10/2003 |
| JP | 6795870 | | 12/2020 |

OTHER PUBLICATIONS

Kubota, JPH09113768A, Machine Translation, (Year: 1997).*
Moriyama JPH11237531A, Machine Translation (Year: 1999).*
"International Search Report (Form PCT/ISA/210) of PCT/JP2021/003920", mailed on Apr. 20, 2021, with English translation thereof, pp. 1-6.

* cited by examiner

*Primary Examiner* — Devina Pillay
(74) *Attorney, Agent, or Firm* — JCIPRNET

(57) ABSTRACT

An optical power supply converter that photoelectrically converts light incident through optical fiber cables is provided with; a reflecting section having a concave reflecting mirror formed with a partially concave surface of an ellipsoid of revolution rotated about a major axis passing through first and second focuses of the ellipse; a light receiving element for photoelectric conversion disposed at the first focus; and an incident portion disposed near the second focus for attaching emitting ends of optical fiber cables that emit light toward the concave reflecting mirror through the second focus.

1 Claim, 7 Drawing Sheets

OPTICAL POWER SUPPLY CONVERTER

CROSS-REFERENCE TO RELATED APPLICATION

This application is a continuation of the International PCT application serial no. PCT/JP2021/003920, filed on Feb. 3, 2021. The entirety of the above mentioned patent application is hereby incorporated by reference herein and made a part of this specification.

TECHNICAL FIELD

The present invention relates to an optical power supply converter that converts light input through an optical fiber cable into a current by photoelectric conversion and feeds the current.

BACKGROUND ART

In special environments, such as remote locations without power supply facilities, environments where weak electromagnetic fields from power supply become noise, environments requiring explosion protection, and environments in ultra-high voltage facilities with electrical mutual influence, electronic devices can not receive power supply via power cables. Therefore, an optical power supply converter is used that sends light to the vicinity of the electronic equipment via an optical fiber cable and converts the light into current.

Such optical power supply converters are required to be capable of outputting even greater power. In order to increase the output, it is effective to increase the optical input to the optical power supply converter. However, a typical single-mode optical fiber has a small core diameter of about 10 µm. Therefore, the core may be damaged by the fiber fuse phenomenon for a large optical input exceeding, for example, 1 W, and there is a limit to increasing the optical input.

For example, as in Patent Document #1, an optical power converter is known in which an array of divided light receiving units are connected in series in order to increase the output voltage of the optical power supply converter, but this device can not increase the output electric power. On the other hand, there is known an optical feeding converter capable of increasing the output by increasing the optical input through a plurality of optical fiber cables, as disclosed in Patent Document #2.

PRIOR ART DOCUMENTS

Patent Documents

Patent Document #1: US Patent Application Publication No. 2011/0108081.
Patent Document #2: Japanese Patent Publication No. 6795870.

SUMMARY OF THE INVENTION

Problems to be Solved by the Invention

However, the optical fiber cable is covered with a coating that protects the core and clad for easy handling, and has a thickness of, for example, 0.9 mm in diameter, which is approximately equal to the length of one side of the light receiving element. Therefore, the number of optical fiber cables that input light to the incident surface of the light receiving element of the optical power feeding converter of Patent Document #2 is limited. In order to increase the number of optical fiber cables, it is necessary to increase the size of the light receiving elements. But, the manufacturing cost may increase in proportion to the increase of the size of the light receiving element.

An object of the present invention is to provide an optical power supply converter capable of increasing the output by increasing the number of optical fiber cables for inputting light without increasing the size of the light receiving element.

Means to Solve the Problems

The optical power supply converter of the invention of claim 1 is an optical power supply converter that photoelectrically converts light incident through optical fiber cables and supplies power to an outside, comprising; a reflecting section having a concave reflecting mirror whose reflecting surface is a partially concave surface of an ellipsoid of revolution formed by rotating an ellipse about a rotating axis which is a major axis passing through first and second focuses of the ellipse; a light-receiving element for photoelectric conversion disposed at the first focus; and an incident portion disposed near the second focus for attaching emitting ends of optical fiber cables that emit light in a direction toward the concave reflecting mirror through the second focus.

According to the above configuration, the light incident from the incident portion through the second focus toward the concave reflecting mirror is reflected by the concave reflecting mirror. This reflected light reaches the first focus based on the properties of the ellipse, since the concave reflecting mirror has the reflecting surface of the partially concave surface of the ellipsoid of revolution. Therefore, the light input can be increased by attaching the emitting ends of plurality of optical fiber cables to the incident portion and emitting light from these emitting ends in the direction toward the concave reflecting mirror through the second focus. Therefore, the output of the optical power supply converter can be increased without increasing the size of the light receiving element.

In an embodiment, the reflecting section includes a plurality of concave reflecting mirrors formed so as to share the light receiving element arranged at the first focus while rotation axes are included in a same plane, and a plurality of incident portions corresponding to a plurality of concave reflecting mirrors are provided.

According to the above configuration, light incident from the plurality of incident portions is reflected by the corresponding plurality of concave reflecting mirrors, and enters the shared light receiving element at the first focus. Therefore, it is possible to increase the light input by mounting the emitting ends of the optical fiber cables on each of the plurality of incident portions corresponding to the plurality of concave reflecting mirrors. Therefore, the output of the optical power supply converter can be increased without increasing the size of the light receiving element.

In an embodiment, the light-receiving element is disposed with a center of a light-receiving surface of the light-receiving element aligned with the first focus, and so as to all of the light reflected by the concave reflecting mirror enter to the light receiving element, the incident portion is formed so that the emitting end can be mounted at a position separated from the second focus by a predetermined separation distance in a direction opposite to a light emitting direction perpendicular to the rotation axis.

According to the above configuration, the center of the light receiving surface of the light receiving element coincides with the first focus. An emitting end of an optical fiber cable for emitting light in a direction orthogonal to the rotation axis of the concave reflecting mirror is attached to the incident portion. The light emitted from the emitting end of a optical fiber cable has a divergence angle, so when the light on its optical axis passes through the second focus and reaches the first focus, the light spreading around the optical axis reaches the vicinity of the first focus without passing through the second focus. So as to all of the light reflected by the concave reflecting mirror enter to the light receiving element, the incident portion is formed so that the emitting end can be mounted at a position separated from the second focus by a predetermined separation distance in a direction opposite to a light emitting direction perpendicular to the rotation axis.

Therefore, since the light is not concentrated on the first focus, it is possible to prevent the light receiving element from being damaged by the incident light. In addition, it is possible to supply power by allowing all of the incident light to enter the light receiving element.

In an embodiment, the light receiving element is disposed with a center of a light receiving surface of the light receiving element aligned with the first focus, and so as to all of the light reflected by the concave reflecting mirrors enter to the light receiving element, the incident portion is formed so that the emitting end can be mounted at a position that is close to the concave reflecting mirror by a predetermined distance from the second focus in the light emitting direction perpendicular to the rotation axis.

According to the above configuration, the center of the light receiving surface of the light receiving element coincides with the first focus. An emitting end of an optical fiber cable for emitting light in a direction orthogonal to the rotation axis of the concave reflecting mirror is attached to the incident portion. The light emitted from the emitting end of an optical fiber cable has a divergence angle, so when the light on its optical axis passes through the second focus and reaches the first focus, the light spreading around the optical axis reach the vicinity of the first focus without passing through the second focus.

So as to all of the light that reaches the vicinity of the first focus is incident on the light receiving element, the incident portion is formed so that the emitting end can be mounted at a position closer to the concave reflecting mirror by a predetermined separation distance from the second focus in the light output direction.

Therefore, since the light is not concentrated on the first focus, it is possible to prevent the light receiving element from being damaged by the incident light. In addition, it is possible to supply power by allowing all of the incident light to enter the light receiving element.

Advantages of the Invention

According to the optical power supply converter of the present invention, the output can be increased by increasing the number of optical fiber cables for inputting light without increasing the size of the light receiving element.

DESCRIPTION OF EMBODIMENTS

Hereinafter, descriptions will be made based on embodiments for implementing the present invention.

First Embodiment

Figure 1:
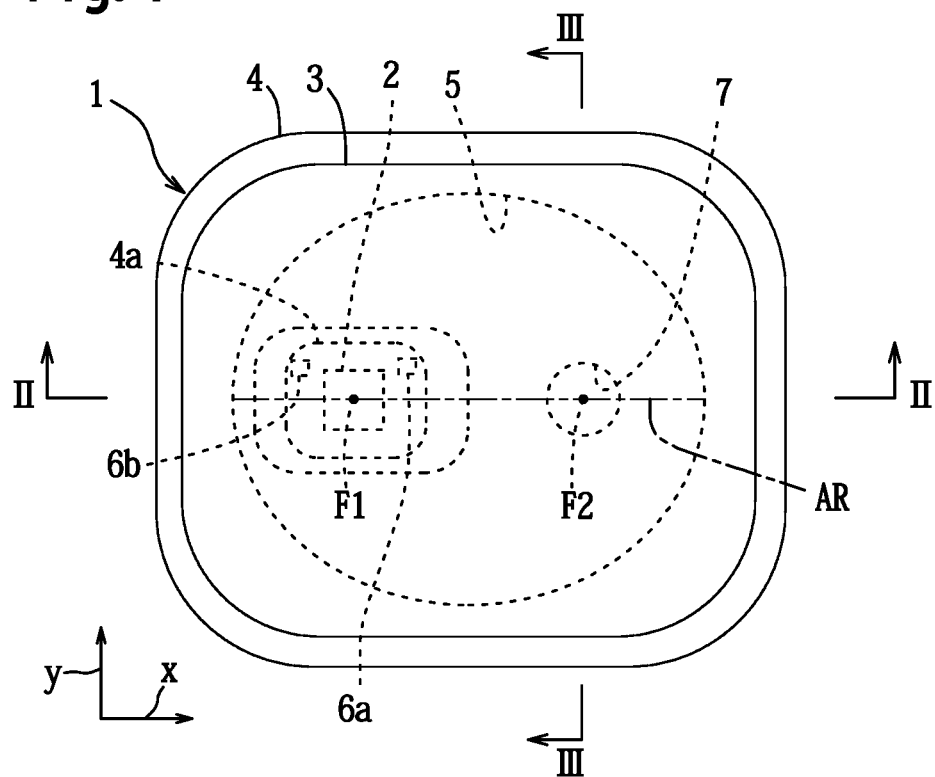
FIG. 1 is a plan view of an optical power supply converter according to the first embodiment of the present invention.
Figure 2:
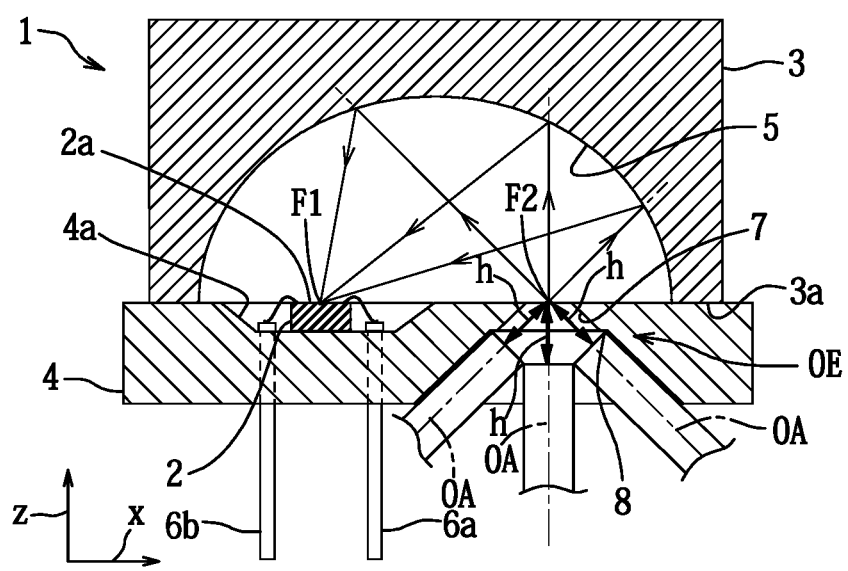
FIG. 2 is a cross-sectional view taken along line II-II of FIG. 1.
Figure 3:
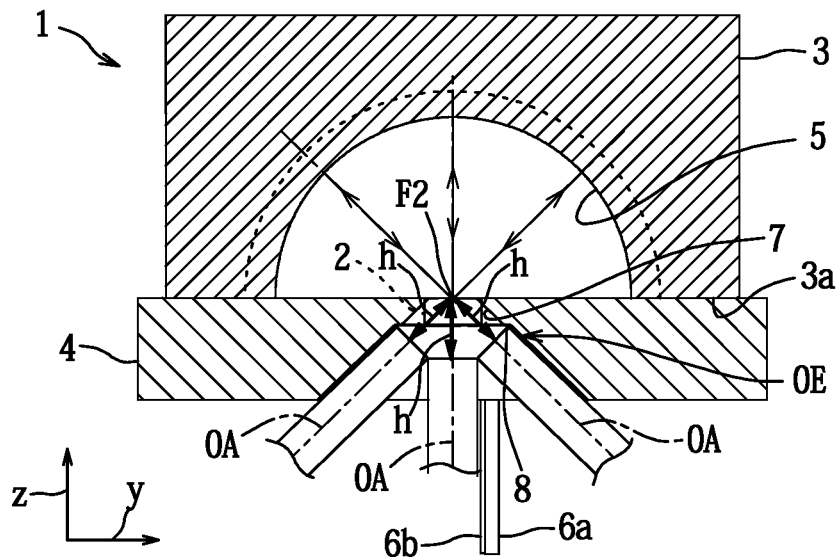
FIG. 3 is a cross-sectional view taken along line III-III in FIG. 1.

As shown in FIGS. 1 to 3, the optical power supply converter 1 comprises a light receiving element 2, and a base 4 for supporting the light receiving element 2 and a reflecting section 3. The light receiving element 2 has a photodiode, although not shown, and is a semiconductor for photoelectric conversion that converts received light of a wavelength in the infrared light region, the visible light region, or the ultraviolet light region into a current by photoelectric conversion and outputs it. In the figure, arrow x indicates the x axis direction, arrow y indicates the y axis direction, and arrow z indicates the z axis direction.

Figure 4:
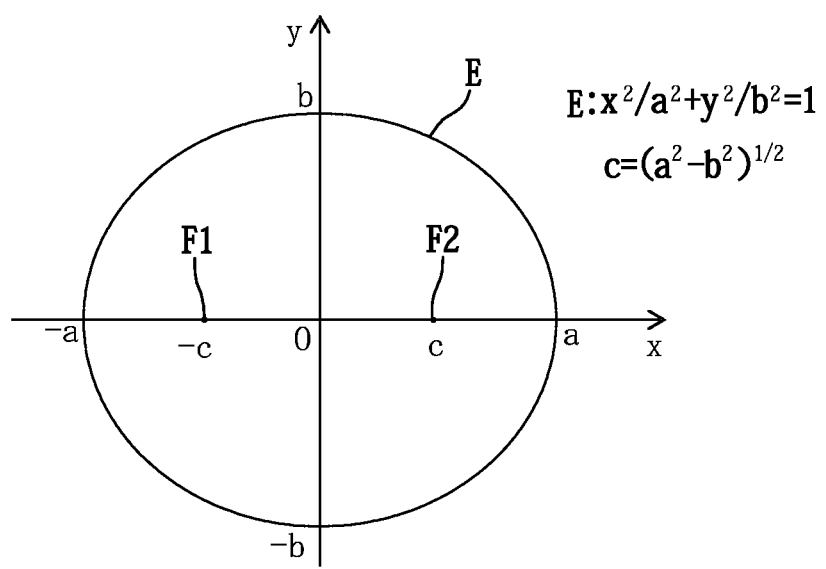
FIG. 4 is an explanatory diagram of an ellipse.

The reflecting section 3 comprises a concave reflecting mirror. The long axis passing through the first focus F1 and the second focus F2 on the x axis of the ellipse E on the xy plane shown in FIG. 4 is rotated around a rotation axis AR as shown in FIGS. 1-3, to form a concave reflecting mirror 5 whose reflecting surface is a partially concave surface of an ellipsoid of revolution. Ellipse E on this xy plane is expressed as $x^2/a^2 + y^2/b^2 = 1$. When the coordinates of the first and second focuses F1 and F2 are (−c, 0) and (c, 0), $c=(a^2-b^2)^{1/2}$. It is assumed that the concave reflecting mirror 5 is formed on the side where the coordinates of the z axis orthogonal to the x axis and the y axis are represented by positive numbers.

As shown in FIGS. 2 and 3, the reflecting section 3 made of synthetic resin, for example, has a concave surface recessed from the surface 3a side. This concave surface is a partial concave surface of an ellipsoid of revolution formed by rotating an ellipse E around the rotation axis AR. The concave reflecting mirror 5 has a reflecting surface of a metal film (eg, Au film) (not shown) formed on this partially concave surface.

Figure 10:
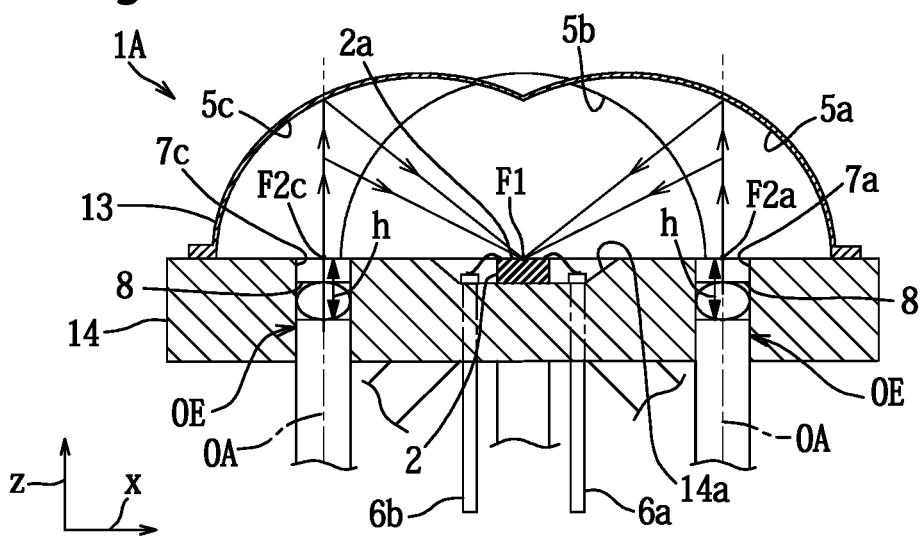
FIG. 10 is a cross-sectional view taken along line X-X of FIG. 9.

The reflecting section 3 is fixed with the surface 3a of the reflecting section 3 in contact with the base 4 by, for example, an adhesive. In addition, the reflecting section 3 may have a concave reflecting mirror having a reflecting surface formed by forming a reflecting metal film on a partially concave surface of a spheroid formed on a thin metal plate by press working, for example (as shown in FIG. 10).

The base 4 is provided with a recessed portion 4a. Then, the light receiving element 2 is arranged in the entrance 4a so that the center of the light receiving surface 2a of the photodiode of the light receiving element 2 and the first focus F1 of the concave reflecting mirror 5 coincide when the reflecting section 3 is fixed to the base 4. By using the base 4 without the recessed portion 4a and arranging, for example, a spacer member between the reflecting section 3 and the base 4, the first focal point F1 and the center of the light receiving surface 2a can be aligned. Alternatively, a portion corresponding to the spacer member may be formed integrally with the reflecting section 3.

The base 4 is equipped with a pair of terminals 6a and 6b passing through the base 4. The pair of terminals 6a and 6b are connected to the light receiving element 2 by metal wires so that the current generated in the light receiving element 2 by photoelectric conversion is output to the outside via the pair of terminals 6a and 6b. Incidentally, the pair of terminals 6a and 6b may be formed along the surface of the base 4.

Further, the base 4 can be equipped with an incident portion 7 capable of mounting an emitting end OE of an optical fiber cable that emits light in a direction toward the concave reflecting mirror 5 through the second focus F2 of the concave reflecting mirror 5 near the second focus F2. The incident portion 7 is a through hole passing through the base 4, and is formed, for example, in a truncated cone shape whose inner diameter decreases as it approaches the side of the base 4 to which the reflecting section 3 is fixed.

A stepped portion 8 is provided so as to encircle the inner wall of the incident portion 7. The emitting end OE inserted into the incident portion 7 along the inner wall of the truncated cone-shaped incident portion 7 or along the center line of the truncated cone-shaped incident portion 7 is secured to the incident portion 7 by, for example, an adhesive or a fixture (not shown).

Due to the nature of the ellipse, the light passing through the second focus F2 and reaching the concave reflecting mirror 5 is reflected by the concave reflecting mirror 5 and reaches the first focus F1. Utilizing this nature, when the emitting ends OE of a plurality of optical fiber cables that emit light in the direction toward the concave reflecting mirror 5 through the second focus F2 are attached to the incident portion 7, the optical input of the light receiving element 2 mounted at the first focus F1 can be increased.

For example, as shown in FIG. 2, a plurality of emitting ends OE may be attached to the incident portion 7 so that the plurality of emitting ends OE that emit light toward the second focus F2 are aligned in the long axis direction of the concave reflecting mirror 5. Since the optical input increases according to the number of optical fibers, the output of the optical power supply converter 1 increases. Further, as shown in FIG. 3, for example, the plurality of emitting ends OE for emitting light toward the second focus F2 are aligned in a direction orthogonal to the major axis of the concave reflecting mirror 5 can be installed on the incident portion 7.

As shown in FIGS. 2 and 3, the plurality of emitting ends OE are attached at positions separated from the second focal point F2 by a predetermined separation distance h in the direction opposite to the direction toward the concave reflecting mirror 5 through the second focus F2. For example, when the emitting end OE is inserted along the inner wall of the incident portion 7 and a part of the end surface of the emitting end OE is brought into contact with the stepped portion 8, the emitting end OE is separated from the second focus F2 by the distance h. Further, the emitting end OE may be separated from the second focus F2 by the separation distance h by a fixture (not shown) for attaching the emitting end OE to the incident portion 7.

Figure 5:
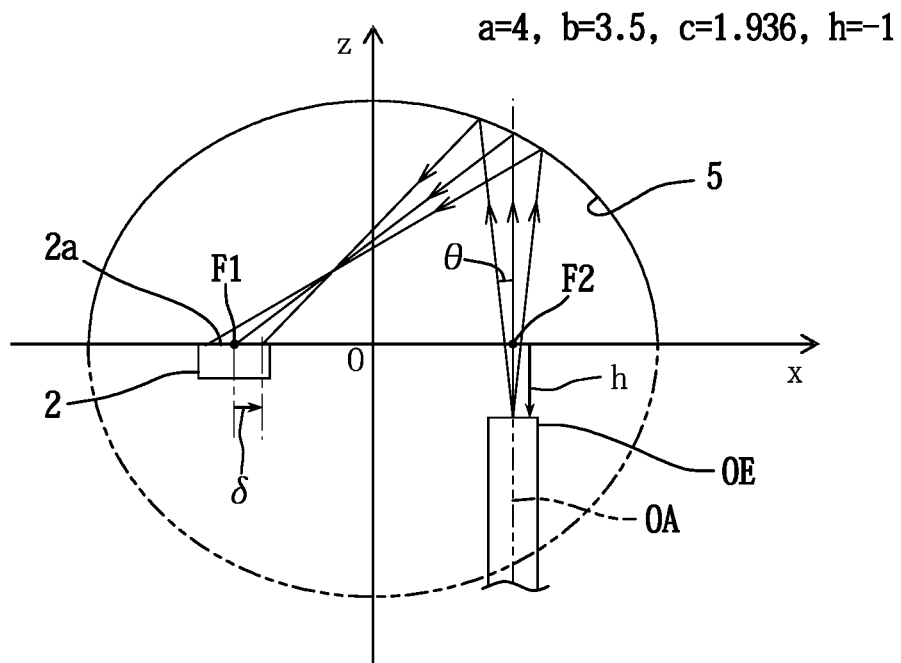
FIG. 5 is an explanatory diagram of an incident position when a position of an emitting end is moved away from a concave reflecting mirror.

As shown in FIG. 5, the light emitted from the emitting end OE travels while spreading at a divergence angle θ (half angle). By attaching the emitting end OE to the incident portion 7 so that the optical axis OA of this emitted light passes through the second focus F2, the light on the optical axis OA is reflected by the concave reflecting mirror 5, and reaches the first focus F1 where the light receiving element 2 is arranged. The light spreading around the optical axis OA is reflected by the concave reflecting mirror 5, condensed once, spreads again, and reaches the vicinity of the first focus F1.

Figure 6:
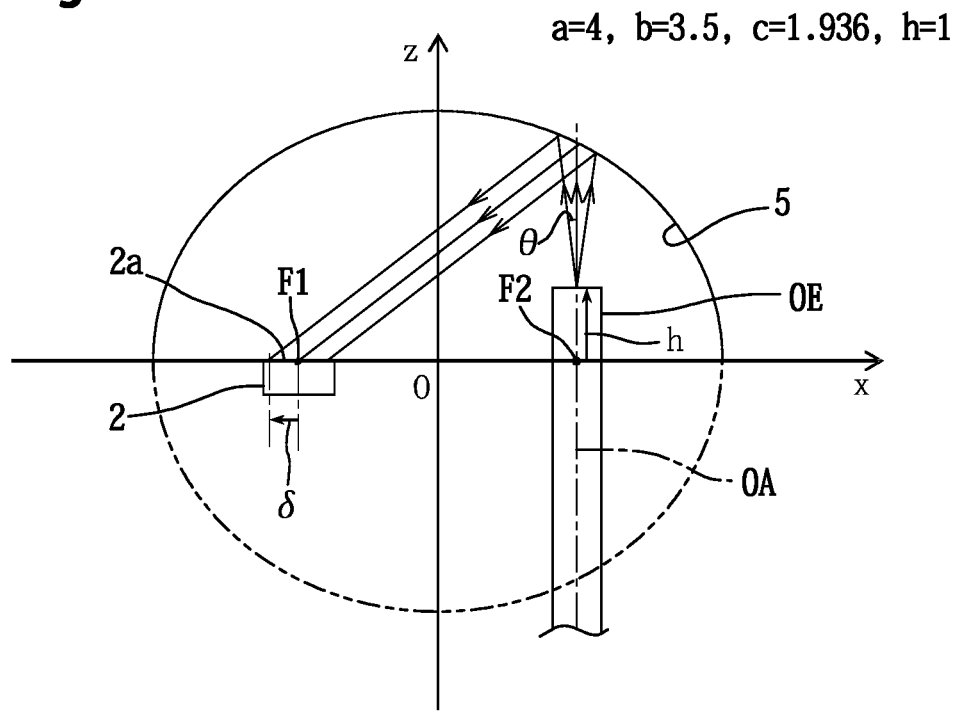
FIG. 6 is an explanatory diagram of an incident position when a position of an emitting end is moved closer to a concave reflecting mirror.

On the other hand, as shown in FIG. 6, the emitting end OE of the optical fiber cable may be fixed at a close position to the concave reflecting mirror 5 by a predetermined separation distance h in the direction toward the concave reflecting mirror 5 through the second focus F2. In this case, only one optical fiber cable can emit light in the direction toward the concave reflecting mirror 5 through the second focus F2. This emitted light also travels while spreading at a divergence angle θ. Light on the optical axis OA is reflected by the concave reflecting mirror 5 and reaches the first focus F1 where the light receiving element 2 is arranged. Light spreading around the optical axis OA reaches the vicinity of the first focus F1.

Figure 7:
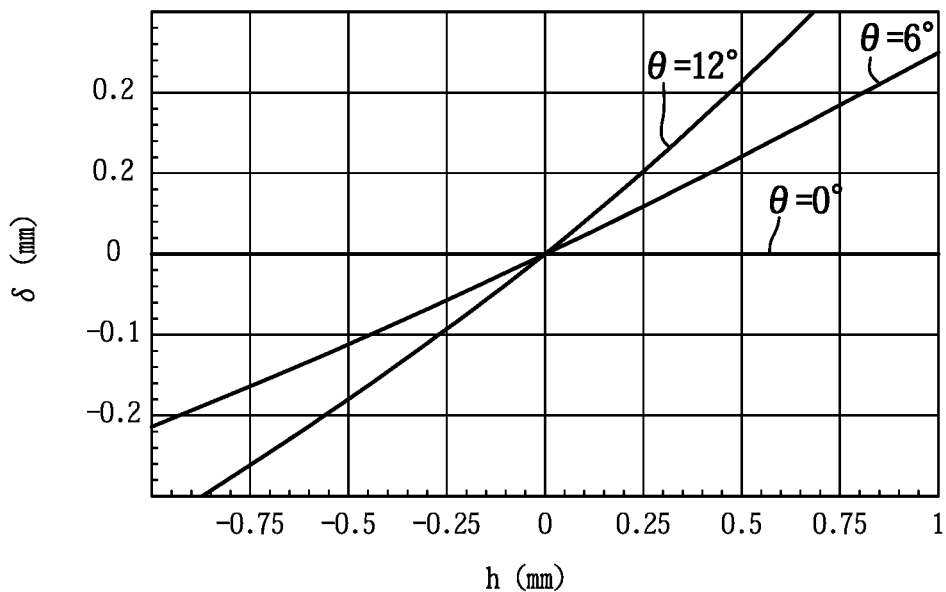
FIG. 7 is a diagram showing a relationship between a separation distance h and an incident position shift δ at different divergence angles θ.

In FIG. 4, assuming that the length of the major axis of the ellipse E that forms the base of the concave reflecting mirror 5 is 8 mm (a=4 mm) and the length of the minor axis is 7 mm (b=3.5 mm), the distance to the first and second focuses F1 and F2 is 1.936 mm (c=1.936 mm). As shown in FIGS. 5 and 6, when a point (−c+δ,0) on the x axis is defined by the light on the side of the origin O among the light emitted from emitting end OE with a divergence angle θ, the relationship between the separation distance h and the incident position shift S for divergence angles θ=0°, 6°, and 120 is shown in FIG. 7. When the position of the emitting end OE is in the positive direction of the z axis with respect to the second focus F2, the separation distance h is set to a positive value, and the reaching position approaches toward the emitting end OE (positive direction of the x axis), the incident position shift δ is set to a negative value. Note that the size of the ellipse E is not limited to the above, and the relationship between the separation distance h and the incident position shift δ is calculated according to the size of the ellipse E.

When θ=0°, the light coincides with the light on the optical axis OA, so the incident position shift S=0 regardless of the separation distance h. When θ=6° and 12°, the absolute value |δ| of the incident position shift δ increases as the absolute value of the separation h increases. Therefore, it can be seen that the farther the emitting end OE is from the second focus F2, the farther the position to reach is from the first focus F1. Also, it can be seen that, if the separation distance h is constant, the greater the divergence angle θ, the farther the reaching position is from the first focus point F1. In general, the divergence angle θ of light emitted from a single-mode optical fiber cable is often about 6°, and the maximum angle is about 12°.

Figure 8:
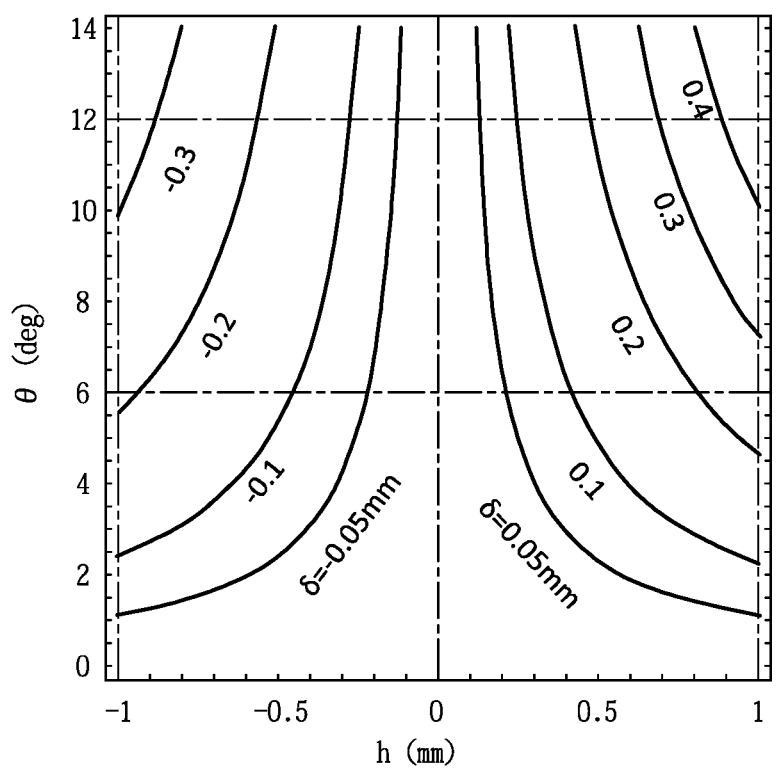
FIG. 8 is a contour plot of an incident position shift δ with a separation distance h and a divergence angle θ as parameters.

The separation distance h is appropriately set in consideration of the divergence angle θ of the light emitted from the emitting end OE of the optical fiber cable so that all the emitted light is incident on the light receiving surface 2a of the light receiving element 2. As shown in FIG. 8, when the divergence angle θ=12°, 0.3 mm<|δ|<0.4 mm when the separation distance h=−1 mm and 0.4 mm<|δ|<0.5 mm when the separation distance h=1 mm. Therefore, all of the light emitted from the emitting end OE can be incident on the light receiving element 2 having the photodiodes on the light receiving surface 2a with a radius of 0.5 mm. In the case of divergence angle θ=6°, since 0.2 mm<|δ|<0.3 mm when the separation distance h=+/−1 mm, the light receiving surface 2a which can receive all of the light emitted from the emitting end OE has a radius of 0.3 mm.

In the case of the separation distance h=−1 mm, as shown in FIG. 3, the emitting ends OE of a plurality of (for example, three) optical fiber cables are arranged in the direction perpendicular to the x axis (rotation axis) so that their optical axes OA pass through the second focus F2.

Also, in FIG. 2, they can be arranged in a direction perpendicular to the axis (rotational axis AR) and attached to the incident portion 7. Also, in FIG. 2, the emitting ends OE of a plurality of (for example, three) optical fiber cables can be arranged in a direction parallel to the x axis so that their optical axes OA pass through the second focus F2, respectively, and can be attached to the incident portion 7. The size of the light receiving surface 2a should be set in consideration of the fact that the incident angle of the light on the light receiving surface 2a become small in case of the optical axis OA that is not parallel to the z axis in FIGS. 2 and 3.

Second Embodiment

Figure 9:
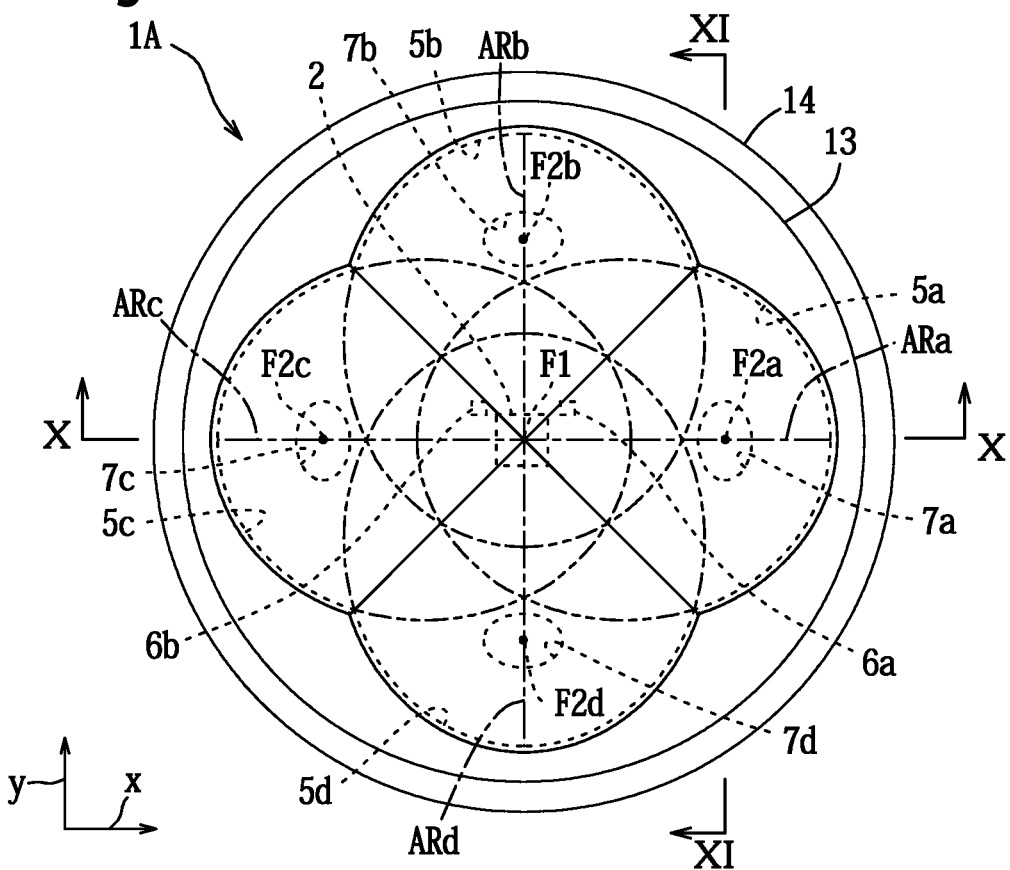
FIG. 9 is a plan view of an optical power supply converter according to the second embodiment of the present invention.
Figure 11:
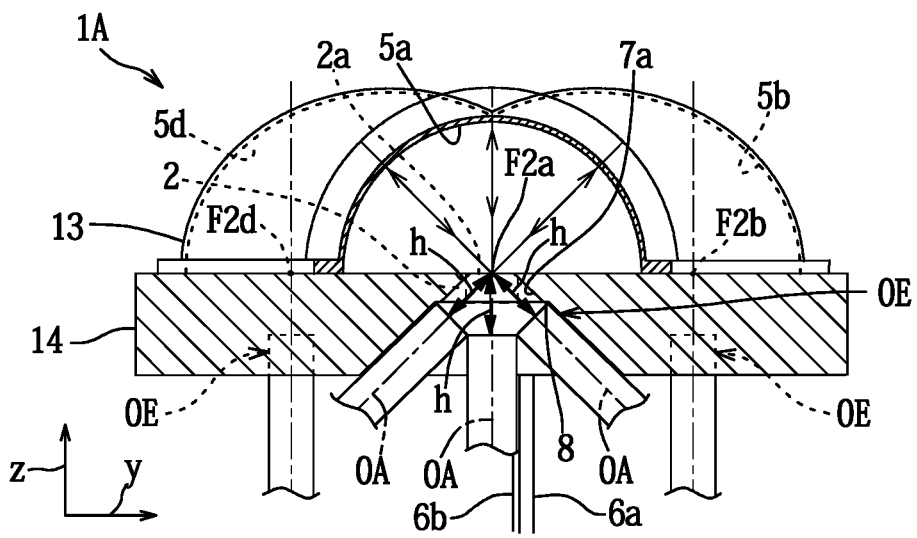
FIG. 11 is a cross-sectional view taken along line XI-XI of FIG. 9.

An optical power supply converter 1A that is a partial modification of the first embodiment will be described. Parts equivalent to those of the first embodiment are denoted by the same reference numerals as those of the first embodiment, and descriptions thereof are omitted. As shown in FIGS. 9 to 11, the optical power supply converter 1A has a light receiving element 2, a reflecting section 13 for reflecting incident light, and a base 14 for supporting the light receiving element 2 and the reflecting section 13.

The reflecting section 13 has a plurality of concave reflecting mirrors 5a-5d. Similar to the concave reflecting mirror 5 of the first embodiment, these concave reflecting mirrors 5a to 5d have a reflecting surface that is a partially concave surface of an ellipsoid of revolution with the major axis of the ellipse E as the rotation axis AR. Assuming that the rotation axes of the concave reflecting mirrors 5a to 5d are rotation axes ARa to ARd, the concave reflection mirrors 5a to 5d have the rotation axes ARa to ARd included in the same plane (xy plane) and share the first focus F1. The second focuses F2a to F2d of the concave reflecting mirrors 5a to 5d are, for example, rotationally symmetrical with respect to the first focus F1 and are formed so as not to overlap each other. The reflecting section 13 is fixed in contact with a base 14 having a pair of terminals 6a and 6b, for example, with an adhesive.

The base 14 is provided with a recessed portion 14a for disposing the light receiving element 2 therein. Then, when the reflecting section 13 is fixed to the base 14, the first focus F1 shared by the concave reflecting mirrors 5a to 5d and the center of the light receiving surface 2a of the photodiode (not shown) of the light receiving element 2 are aligned. Furthermore, the light receiving element 2 is arranged in the recessed portion 14a. Accordingly, the concave reflecting mirrors 5a-5d share the light receiving element 2 arranged at the first focus F1.

The base 14 also has a plurality of incident portions 7a-7d corresponding to the concave reflecting mirrors 5a-5d. The incident portions 7a-7d are provided near the second focuses F2a-F2d of the concave reflecting mirrors 5a-5d, respectively. For example, an emitting end OE of an optical fiber cable that outputs light in a direction toward the concave reflecting mirror 5a through the second focus F2a can be attached to the incident portion 7a.

The incident portion 7a is a through hole that penetrates the base 14, and is formed in a partial truncated cone shape, for example, the inner diameter of which decreases as it approaches the side of the base 14 where the reflecting section 13 is fixed. The emitting end OE of the optical fiber cable inserted into the incident portion 7a along the wall of the incident portion 7a or along the center line of the incident portion 7a is attached by, for example, an adhesive or a fixture (not shown). The other incident portions 7b to 7d are similar to the incident portion 7a.

In order to make the light incident on the light receiving element 2 arranged at the first focus F1 by utilizing the property of the ellipse, the emitting end OE of multiple optical fiber cables are attached to the incident portion 7a emitting the light in the direction toward the concave reflecting mirror 5a through the second focus F2a. Similarly to the incident portion 7a, the incident portions 7b to 7d are also provided with emitting ends OE of a plurality of optical fiber cables that emit light in directions toward the concave reflecting mirrors 5b to 5d through the second focuses F2b to F2d, respectively. Since the optical input increases according to the number of optical fibers, the output of the optical power supply converter 1A increases.

As shown in FIG. 5 of Embodiment 1, in the incident portion 7a, the plurality of emitting ends OE are separated from the second focus F2a by a predetermined separation distance h in the direction opposite to the light incident direction so that the optical axis OA passes through the second focus F2a. As a result, light can be emitted from the plurality of emitting ends OE so as to pass through the second focus F2a, and all of the emitted light can be incident on the light receiving surface 2a of the light receiving element 2. The same applies to the other incident portions 7b to 7d. Since the light spreads and enters the light receiving surface 2a of the light receiving element 2, damage to the light receiving element 2 due to light input can be prevented.

Further, as in FIG. 6 of the first embodiment, for example, at the incident portion 7a, the emitting end OE is shifted from the second focus F2a by a predetermined separation distance h in the light incident direction so that the optical axis OA passes through the second focus F2a and approach the concave reflecting mirror 5a. As a result, although only one emitting end OE can be attached to the incident portion 7a, all of the emitted light can be incident on the light receiving surface 2a of the light receiving element 2. In this case, it becomes easy to increase the number of incident portions.

Figure 12:
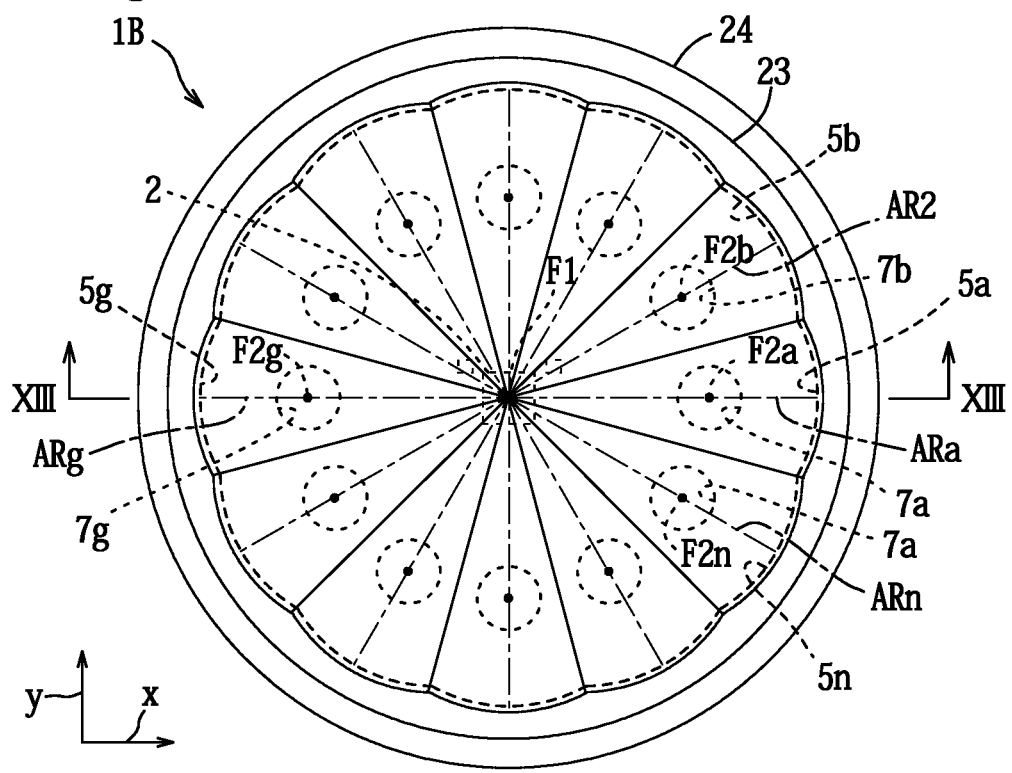
FIG. 12 is a plan view showing another example of the optical power supply converter.
Figure 13:
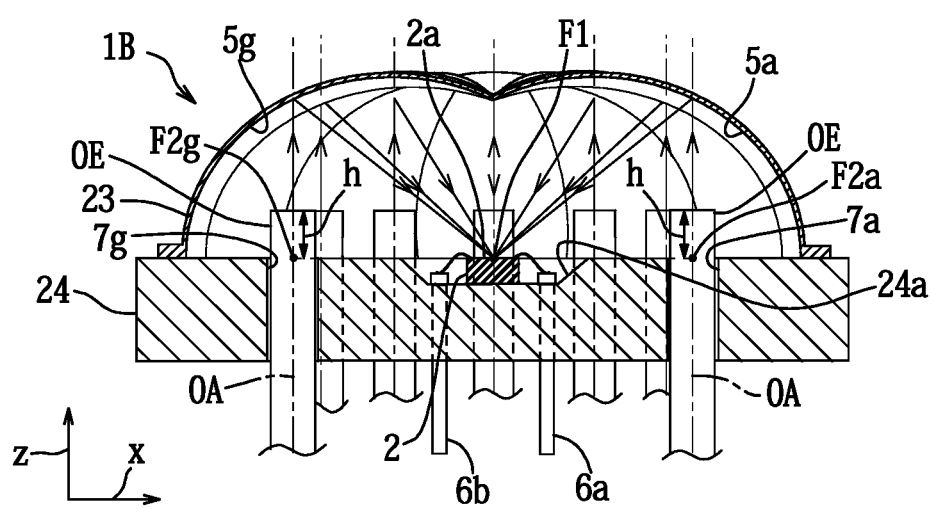
FIG. 13 is a cross-sectional view taken along line XIII-XIII of FIG. 12.

For example, as shown in FIGS. 12 and 13, an optical power supply converter 1B can be formed having a reflecting section 23 having a plurality of concave reflecting mirrors 5a to 5n sharing the light receiving element 2 at the first focus point F1 and a base 24 on which an incident section 7a-7n corresponding to the plurality of concave reflecting mirrors 5a to 5n are formed. The light receiving element 2 is arranged in the concave portion 24a provided in the base 24 so that the first focus F1 and the center of the light receiving surface 2a of the light receiving element 2 are aligned. Each of the incident portions 7a to 7n has a cylindrical inner wall having a central axis parallel to the z axis direction.

An emitting end OE of one optical fiber cable is attached to each of the plurality of incident portions 7a to 7n so that the optical axis OA passes through the corresponding second focuses F2a to F2n. Since the emitting end OE can be attached to each of the plurality of incident portions 7a to 7n with the plurality of optical fiber cables arranged in parallel, the attachment can be facilitated. In addition, it is possible to increase the output by increasing the number of optical fiber cables for inputting light without enlarging the light receiving element 2.

Each emitting end OE is brought closer to the concave reflecting mirrors 5a-5n by a predetermined separation distance h from the corresponding second focuses F2a-F2n. As a result, all of the light emitted from the emitting end OE of the optical fiber cable can be made incident on the light receiving element 2. Alternatively, they may be separated from the second focuses F2a to F2n by the separation distance h in the opposite direction to the concave reflecting mirrors 5a to 5n. Stepped portions that contact the end face of the output end OE so that the end face of the emitting end OE is separated from the second focuses F2a to F2n by the separation distance h are provided so as to encircle the inner walls of the incident portions 7a to 7n. The number of incident portions corresponding to the plurality of concave reflecting mirrors is not limited to the above, and can be set as appropriate.

Actions and effects of the optical power supply converters 1, 1A, and 1B will be described.

The concave reflecting mirrors 5, 5a of the optical power supply converters 1, 1A, whose reflecting surfaces are the partially concave surfaces of the ellipsoid of revolution reflects the light incident in the direction towards the mirrors 5, 5a passing through the second focuses F2, F2a of the concave reflecting mirrors 5, 5a from the incident portions 7, 7a, and the concave reflecting surfaces. Light incident through the second focuses F2 and F2a and reflected by the concave reflecting mirrors 5 and 5a reaches the first focus F1 of the concave reflecting mirrors 5 and 5a based on the elliptical property. Therefore, light can be incident on the concave reflecting mirrors 5 and 5a from a plurality of directions through the second focuses F2 and F2a at the incident portions 7 and 7a, thereby increasing the light input. Therefore, the outputs of the optical power supply converters 1 and 1A can be increased without increasing the size of the light receiving element 2 arranged at the first focus F1.

The optical power supply converters 1A and 1B can reflect the light incident from the incident portions 7a to 7d and 7a to 7n corresponding to the plurality of concave reflecting mirrors 5a to 5d and 5a to 5n, and can make incident the received light to the light receiving welement 2 shared at the first focus F1. Therefore, by mounting the emitting end OE of a plurality of optical fiber cables to increase the optical input, the output of the optical power supply converters 1A and 1B can be increased without enlarging the light receiving element 2.

The light receiving element 2 is arranged so that the center of the light receiving surface 2a coincides with the first focus F1 of the concave reflecting mirrors 5, 5a to 5d, 5a to 5n. The incident portions 7, 7a to 7d, and 7a to 7n are formed to mount the emitting end OE of the optical fiber cable at the position separated in the direction opposite to the light output direction by separation distance h from the second focuses F2, F2a-F2d, F2a-F2n in the direction opposite to the concave reflecting mirror 5, 5a-5d, 5a-5n so that all of the light that reaches the vicinity of the first focus F1 is incident on the light receiving element 2. The emitting end OE of the optical fiber cable that emits light in a direction perpendicular to the rotation axes AR, ARa-ARd, and ARa-ARn of the concave reflecting mirrors 5, 5a-5d, and 5a-5n is mounted on the incident portion 7, 7a-7d, 7a to 7n.

Light emitted from the emitting end OE of the optical fiber cable has a divergence angle θ. Light on the optical axis OA reaches the first focus F1 through the second focuses F2. F2a-F2d, F2a-F2n. At this time, the light spreading around the optical axis OA does not pass through the second focuses F2, F2a to F2d, and F2a to F2n, so it reaches the vicinity of the first focus F1. Therefore, since the light is not concentrated on the first focal point F1, it is possible to prevent the light receiving element 2 from being damaged by the incident light. In addition, all of the incident light can be incident on the light receiving element 2 for power supply.

In the optical power supply converter 1B, the incident portions 7a to 7n is formed to mount the emitting end OE of the optical fiber cable at the position close to the concave reflecting mirrors 5a-5n in the light emitting direction by the separation distance h from the second focuses F2a-F2n so that all of the light that reaches the vicinity of the first focus F1 is incident on the light receiving element 2. Emitting ends OE of optical fiber cables for emitting light in a direction perpendicular to the rotation axes ARa-ARn of the concave reflecting mirrors 5a-5n are attached to the incident portions 7a-7n.

Light emitted from the emitting end OE of the optical fiber cable has a divergence angle θ. Light on the optical axis OA passes through the second focuses F2a-F2n and reaches the first focus F1. At this time, the light spreading around the optical axis OA reaches the vicinity of the first focus F1 because it does not pass through the second focuses F2a to F2n. Therefore, since the light is not concentrated on the first focus F1, it is possible to prevent the light receiving element from being damaged by the incident light.

In addition, all of the incident light can be incident on the light receiving element 2 for power supply.

In addition, those skilled in the art can implement various modifications to the above embodiments without departing from the scope of the present invention, and the present invention includes such modifications.

DESCRIPTION OF REFERENCE NUMERALS 1, 1A, 1B: optical power supply converter
2: light receiving element
2a: light receiving surface
3, 13, 23: reflector
3a: face
4, 14, 24: base
4a, 14a, 24a: recessed part
5, 5a to 5n: concave reflecting mirror
6a, 6b: terminals
7, 7a to 7n: incident portion
8: step
AR, ARa to ARn: rotation axis
E: ellipse
F1: 1st focus
F2, F2a to F2n: 2nd focus
OA: optical axis
OE: emitting end
h: separation distance
δ: incident position shift
θ: divergence angle

The invention claimed is:

1. An optical power supply converter that photoelectrically converts light incident through optical fiber cables and supplies power to an outside, comprising;
   a reflecting section having a concave reflecting mirror whose reflecting surface is a partially concave surface of an ellipsoid of revolution formed by rotating an ellipse about a rotating axis which is a major axis passing through first and second focuses of the ellipse;
   a light receiving element for photoelectric conversion disposed at the first focus with a center of a light-receiving surface of the light-receiving element aligned with the first focus, so that all of the light reflected by the concave reflecting mirror enter to the light receiving element; and
   an incident portion disposed near the second focus for attaching emitting ends of optical fiber cables that emit light in a direction toward the concave reflecting mirror through the second focus, wherein
   the reflecting section includes a plurality of concave reflecting mirrors formed so as to share the light receiving element arranged at the first focus while rotation axes are included in a same plane,
   a plurality of incident portions corresponding to a plurality of concave reflecting mirrors are provided; and
   each of the incident portions is formed in a partial truncated cone shaped through a hole that penetrates a base for supporting the light receiving element and the reflecting section and shrinks in diameter toward the concave reflecting mirror to allow an attachment of output ends of a plurality of the optical fiber cables at positions separated from the second focus by a predetermined separation distance in a direction opposite to a light emitting direction perpendicular to the corresponding rotation axis.

* * * * *